United States Patent

Gardner

[11] 3,930,600
[45] Jan. 6, 1976

[54] INJECTION MOLDING DEVICE WITH BACK PRESSURE CONTROL OF SCREW MOVEMENT

[76] Inventor: Victor Thomas Gardner, Staniforth Road, Sheffield S9 4LS, England

[22] Filed: May 22, 1973

[21] Appl. No.: 362,772

[30] Foreign Application Priority Data
May 30, 1972 United Kingdom............. 25245/72

[52] U.S. Cl. ............... 222/334; 222/413; 425/146; 425/247
[51] Int. Cl.² ............................................. B29F 1/06
[58] Field of Search ...... 264/40, 328, 329; 425/149, 425/245 R, 247, 167, 146; 222/63, 413, 334

[56] References Cited
UNITED STATES PATENTS

| | | | |
|---|---|---|---|
| 2,950,501 | 8/1960 | Horkenrider | 425/245 X |
| 3,140,332 | 7/1964 | Brown | 425/149 X |
| 3,492,700 | 3/1970 | Kornmayer | 264/40 |
| 3,538,549 | 11/1970 | Hehl | 425/247 X |
| 3,695,800 | 10/1972 | Hutchinson | 264/40 X |
| 3,721,512 | 3/1973 | Ma | 264/40 X |

*Primary Examiner*—Robert B. Reeves
*Assistant Examiner*—David A. Scherbel
*Attorney, Agent, or Firm*—Andrew J. Beck

[57] ABSTRACT

A method of and apparatus for injection molding of materials such, for example, as thermoplastic resinous material, utilizing a rotatable and reciprocal screw extruder for plasticizing and injecting the material into a mold cavity, and wherein an injection piston in a cylinder is operatively connected to the plasticizing screw to push the screw forward to effect injection into a mold of plasticized material in front of the screw. A supply of fluid pressure is positively applied to the injection piston to provide a back pressure to act against the reaction caused by the rotation of the plasticizing screw, and this back pressure may be regulated to correspond with the rearward displacement of the screw.

4 Claims, 1 Drawing Figure

U.S. Patent   Jan. 6, 1976   3,930,600
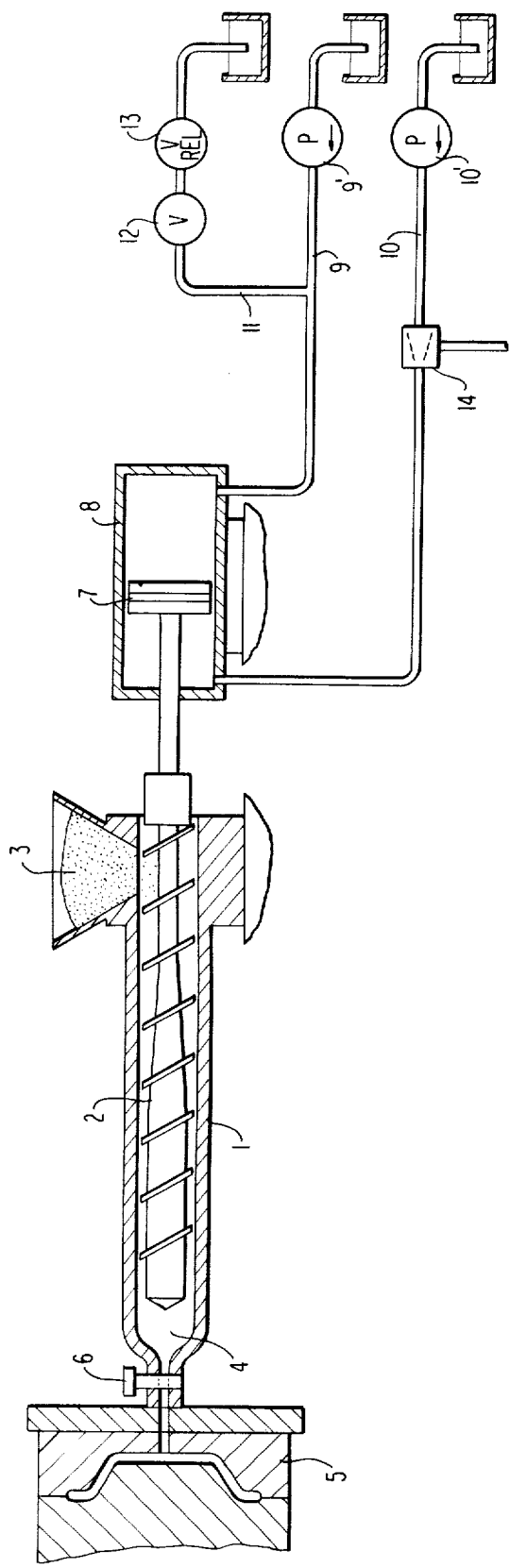

INJECTION MOLDING DEVICE WITH BACK PRESSURE CONTROL OF SCREW MOVEMENT

BACKGROUND OF THE INVENTION

This invention relates to improvements in method and apparatus for injection molding of material such, for example, as thermoplastic resinous material.

In the injection molding of thermoplastic material, the material is plasticized prior to injection into a mold by means of a reciprocating screw plasticizing unit. In such a unit, the material to be molded is fed in granular, powder or other form to a plasticizing barrel to be transported by rotation of the screw to the head of the plasticizing barrel. The material is heated and mechanically worked to a plastic state during its movement by the screw through the plasticizing barrel.

The accumulation of material at the cylinder head results in the displacement of the extrusion screw, thereby pushing the screw backwards in the plasticizing barrel. When enough material has been accumulated to fill the mold, a valve in the injection nozzle is opened and the extrusion screw, acting as a ram, is pushed forward by means of an injection piston mounted for reciprocating movement and operatively connected with the screw. This forward movement of the screw under the action of the piston causes the plastic material to be injected from the plasticizing barrel into the mold. Upon completion of the injection stroke, the screw is rotated again so as to replace the injected volume of material and the cycle is then renewed.

It has been found that on rotation of the screw, the interaction between the helix of the screw and the plastic material, which latter has a high viscosity, causes the screw to push back along the plasticizing barrel before the plastic material reaches the head of the plasticizing barrel. To offset this effect, it has been the practice heretofore to restrict the backward movement of the screw by restricting the displacement of hydraulic fluid from the injection cylinder in which an operative piston is connected with the screw. This can be achieved either by including a flow restrictor in the hydraulic return pipe or by causing the displaced fluid to return to a pressure relief valve. There is a disadvantage in the use of the flow restrictor in that the pressure generated in the injection cylinder is dependent upon the plasticizing rate and will therefore vary with changes in the speed of the plasticizing screw. A disadvantage in both systems suggested is that the screw would start to rotate before the back pressure has been produced. This would cause pockets of gas and volatile substances to be present in the volume of material to be injected. Also, with the systems at present in use, the low pressures involved, especially at low screw speeds, result in difficulties of accurately controlling the valves.

SUMMARY OF THE INVENTION

One object of this invention is to improve injection molding devices of the type described and to obviate the objections thereto as recited.

Another object of the invention is to maintain effective control over the plasticizing screw by applying back pressure which acts against the reaction caused by the rotation of the plasticizing screw in feeding the material.

A more specific object of the invention is to provide for programmed changes in back pressure inhibiting backward movement of the plasticizing screw so that plasticizing conditions may be improved by slowing the rearward movement of the screw to compensate for the decrease in effective screw length which occurs as the screw moves rearwardly.

These objects may be accomplished, according to one embodiment of the invention, by providing a movable head such, for example, as the piston in a hydraulic cylinder forming the injection means, which head is operatively connected with the screw and will move the screw in its reciprocating action. Positive pressure is maintained on both sides of the piston in such a manner that there will be a pressure differential which must be overcome by reaction forces of the screw against the material being processed. This pressure differential may be controlled to regulate the speed at which the screw is allowed to recede as it is rotated to feed the material forward in the plasticizing barrel. Thereafter, the piston is subjected to increased pressure to project the screw bodily forward for injecting the material from the head of the barrel into the mold.

While there are a number of advantages to the improved hydraulic system, a main advantage is that there is applied back pressure which is controllable independently of the plasticizing screw displacement and/or speed of rotation.

BRIEF DESCRIPTION OF THE DRAWING

This embodiment of the invention is illustrated in the accompanying drawing which is a diagrammatic illustration of apparatus embodying the invention and used for practicing the method as described.

DETAILED DESCRIPTION OF DISCLOSURE

The apparatus illustrated in the drawing comprises a plasticizing cylinder or barrel, generally indicated by the numeral 1 and having a plasticizing screw 2 mounted therein for rotation and for reciprocation. The screw 2 is power driven for rotation in the cylinder or barrel 1 by suitable means, not shown, as well as for reciprocating movement bodily in the cylinder or barrel. The barrel 1 usually is provided with means for maintaining the barrel at a uniform high temperature, such as band type heaters around the exterior of the barrel. The screw 2 has suitable means (not shown) for effecting rotation thereof.

A feed inlet, such as a hopper 3, is connected with the cylinder or barrel 1 at one end thereof to feed the material to be molded to the cylinder or barrel. This material may be in the form of granules, powder or of other suitable form which may be introduced to the cylinder or barrel and transformed to plastic condition as it is fed therethrough by the action of the screw.

At the opposite end 4 of the cylinder or barrel 1 from the material supply 3, the material is accumulated in an amount sufficient to fill the mold. This material is then injected into the mold 5 through a nozzle valve 6 which connects the barrel head 4 with the mold cavity by suitable gating. This injection action is caused by a forward thrust of the screw 2 to discharge the plastic material from the barrel head 4 into the mold cavity.

The injection stroke of the screw is caused by the action of a power head in this embodiment of the invention, which is indicated at 7, and which is operatively connected with the screw so as to cause bodily movement of the screw upon advance of the head 7. The power head or piston 7 is operatively mounted in a hydraulic cylinder 8 so as to provide for the application of pressure to opposite sides of the head, fluid being supplied through conduits 9 and 10.

The fluid supply line 9 has a branch conduit 11 which is in communication with a cut off valve 12 and a pressure release valve 13. The supply line 9 is also connected with a suitable source of fluid under pressure, as indicated at 9'.

The fluid supply line 10 likewise has a source of fluid under pressure, as indicated at 10', as well as a system of valves diagrammatically indicated generally at 14, for controlling pressure on the forward side of the injection head or piston 7.

At the end of the injection portion of the cycle, immediately following the injection stroke, the screw 2 would be in its forward position at the head of the plasticizing barrel or cylinder. The pressure at the rear of the injection barrel or cylinder is much higher than that at the front of the barrel or cylinder since the pressure difference across the head 7 has just been used to effect the injection of the plastic material into the mold.

The cut off valve 12 is now opened, enabling the pressure release valve 13 to reduce the pressure at the rear side of the injection head 7 within the cylinder 8 to a predetermined level so that only a small pressure difference now exists across the head 7. This pressure difference acts so as to oppose backward movement of the screw 2.

The screw 2 is then rotated to start the shot preparation portion of the cycle, and the screw transports the raw material from the inlet point 3 to the head 4 of the plasticizing barrel or cylinder. As soon as the plastic material begins to reach the head of the plasticizing cylinder, the screw is forced backward against the back pressure in the injection cylinder and this continues until the plasticizing screw reaches the rear position, marking the end of the shot preparation portion of the cycle. The nozzle valve 6 is then opened to allow the plastic material to flow into the mold and at the same time the cut off valve 12 is closed, producing an almost immediate build up in pressure behind the head 7, which pressure thrusts the plasticizing screw forward, injecting the plastic material into the mold.

As the injection process is completed, the nozzle valve 6 is closed and the cut off valve 12 is opened, thus reducing the pressure in the injection cylinder and the cycle starts again.

A supply of pressure to the injection cylinder 8 is maintained throughout the cycle. The pressure necessary for the injection stroke is reduced between the injection strokes by the opening of a pressure release valve in fluid connection with the injection cylinder. It will be apparent that the fluid supplies to both sides of the injection piston or head will be of different known pressures, thus enabling high pressure to be applied on both sides of the injection head and yet achieving a pre-set low value pressure differential, acting as back pressure. This has the advantage of enabling a more exact setting of the valves, which tend to operate more accurately at higher operating pressures. This supply may be provided from a separate pump, as shown in the drawing, or quickly supplied from the rear side of the cylinder from which the fluid is being displaced.

Within the supply and control circuitry, it is also possible to allow for pressure equalization prior to the start of screw rotation so that decompression from the mold system can be effected prior to the closure of the injection valve. For example, after the injection stroke of the piston 7 has been completed and before the rotation of the screw 2 has been commenced, the valve 12 may be opened and the valve means 14 may be operated so that the pressure from line 10 will be equal for a short time to the pressure in line 9 established by the relief valve 13. This is advantageous when using specific molding techniques.

With this positive back pressure system, it is also possible to program changes in back pressures to correspond with the displacement of the plasticizing screw. For example, the control valve means 14 may be programmed to close partially during a desired portion of the rearward stroke of the screw 2 to reduce the pressure ahead of the piston 7 and thereby increase the differential pressure on the piston 7 tending to retard the rearward movement of the screw in response to the reaction forces generated as it works the material being processed. This increase of differential pressure and thereby effective back pressure would improve the plasticizing conditions to compensate for a reduction of effective screw length.

While the invention has been illustrated and described in one embodiment, it is recognized that variations and changes may be made therein without departing from the invention as disclosed.

I claim:

1. In injection molding apparatus of the type in which increments of plasticized material are intermittently supplied to mold means from a barrel provided with a screw operating on a cycle that includes (a) a shot preparation portion during which the screw is rotated to feed the material to be molded toward a front end of the barrel with the screw being allowed to move rearwardly in the barrel until enough material is accumulated in the front end portion of the barrel to fill a mold cavity and (b) an injection portion during which communication is established between the front end of the barrel and the mold cavity and the screw is thrusted forwardly in the barrel to inject the material from the front end portion of the barrel into the mold cavity, the combination comprising a fluid cylinder having front and rear ends;

piston means operatively connected with said screw for reciprocation therewith and including a head movable forwardly and rearwardly in said cylinder; and means operatively connected to both the front and rear ends of said cylinder for supplying fluid under predetermined pressure both to the front end and to the rear end of said cylinder throughout said shot preparation portion of said cycle to provide opposing forces on opposite sides of said head of such magnitude that a net force difference resists rearward movement of said head and of the screw connected therewith.

2. Apparatus according to claim 1, wherein said means for supplying fluid under pressure includes a first source of fluid under pressure operatively connected to said front end of said cylinder;

a second source of fluid under pressure operatively connected to said rear end of said cylinder; and means for controlling the magnitude of the pressure of the fluid supplied to the rear end of said cylinder from said second source independently of the pressure of the fluid supplied to the front end of said cylinder.

3. Apparatus according to claim 2, wherein said second source of fluid under pressure provides pressure much higher than the pressure of the fluid supplied to the front end of said cylinder, and wherein said means for controlling the magnitude of the pressure of the fluid supplied to the rear end of said cylinder includes:

relief valve means operable at a pressure lower than the pressure provided by said second source but higher than a pressure which, when applied to the rear of said head, would produce a force on the head equal to that produced by the pressure of the fluid supplied to the front end of said cylinder, and means connecting the rear end of said cylinder to said second source and to said relief valve with a shut-off valve interposed between said cylinder and said relief valve so that, during the injection portion of said cycle, said shut-off valve may be closed to provide high pressure on the rear of said head for thrusting said screw forwardly in said barrel and, during the shot preparation portion of said cycle, said shut-off valve may be opened to provide a pressure on the rear of said head sufficient to produce the said net force difference resisting rearward movement of said head.

4. Apparatus according to claim 1, additionally comprising means for controlling the magnitude of the pressure of the fluid supplied to the front end of said cylinder from said first source of fluid under pressure independently of the pressure of the fluid supplied to the rear end of said cylinder.

* * * * *